United States Patent
Graham, Jr.

(10) Patent No.: US 7,424,422 B2
(45) Date of Patent: Sep. 9, 2008

(54) VOICE CHANNEL BUSSING IN SOUND PROCESSORS

(75) Inventor: Ray Graham, Jr., Walnut Creek, CA (US)

(73) Assignee: LSI Corporation, Milpitas, CA (US)

( * ) Notice: Subject to any disclaimer, the term of this patent is extended or adjusted under 35 U.S.C. 154(b) by 770 days.

(21) Appl. No.: 10/921,643

(22) Filed: Aug. 19, 2004

(65) Prior Publication Data

US 2006/0041434 A1    Feb. 23, 2006

(51) Int. Cl.
*G10L 21/02*    (2006.01)
(52) U.S. Cl. .................... 704/200; 704/201; 381/61

(58) Field of Classification Search ................. 704/200, 704/201; 381/61
See application file for complete search history.

(56) References Cited

U.S. PATENT DOCUMENTS

| | | | | |
|---|---|---|---|---|
| 5,592,602 A | * | 1/1997 | Edmunds et al. | 345/474 |
| 5,998,724 A | * | 12/1999 | Takeuchi et al. | 84/622 |
| 7,065,222 B2 | * | 6/2006 | Wilcock | 381/310 |

* cited by examiner

*Primary Examiner*—Daniel D Abebe
(74) *Attorney, Agent, or Firm*—Strategic Patent Group, P.C.

(57) ABSTRACT

The invention is a method and system for applying more effects to voices in an input sound than is capable of being supported by a sound processor. Aspects of the invention include identifying at least one of the voices of the input sound as a voice bus channel; and during processing of the input sound, inputting and adding sound that was mixed from outputs of previously processed voices to the voice bus channel to create a summed result. An effect specified for the voice bus channel is then applied to the summed result, thereby applying the effect to the previous the process voices.

32 Claims, 7 Drawing Sheets

VOICE CHANNEL BUSSING IN SOUND PROCESSORS

FIELD OF THE INVENTION

The present invention relates to sound processing, and more particularly to a method and system for applying more effects to voices in an input sound than is capable of being supported by a sound processor.

BACKGROUND OF THE INVENTION

Digitally recorded sound must typically be input to and processed by a sound processor. The sound is typically input as a series of frames, each having some number of voices (e.g., 64), and each voice comprises some number of sound samples (e.g., 32). The sound processor typically processes each of the voices serially, although parallel processing is also done. In serial embodiments, the sound processor has a finite amount of time, called a voice time slot or voice channel in which to process each voice. The time slots are used independently to initiate and control the fetching, interpretation, and processing of sound data that will ultimately be heard through speakers. The sound processor uses each voice time slot to control how the voices in the input sound will be modified by certain effects during the data processing stage. Examples of effects applied to the voices commonly include gain envelopes, low frequency oscillator (or "LFO") incorporation (as gain or pitch), and pitch envelopes. Typically, a software program instructs the sound processor on which effects to apply to the voices. Low-cost, low-power processor solutions limit which per-voice effects may be applied, which may leave the programmer to develop more complicated, more memory dependent/intensive solutions to process the voice(s) of an input sound. Even high-cost processor solutions have inherent limits on how much processing may be done on a voice. Because all of the voices have to be completed within a very specific amount of time (number of clock cycles), the options to design hardware that allows more effects to be applied to the voices is limited to either increasing the clock speed or increasing the amount of logic.

Figure 1:
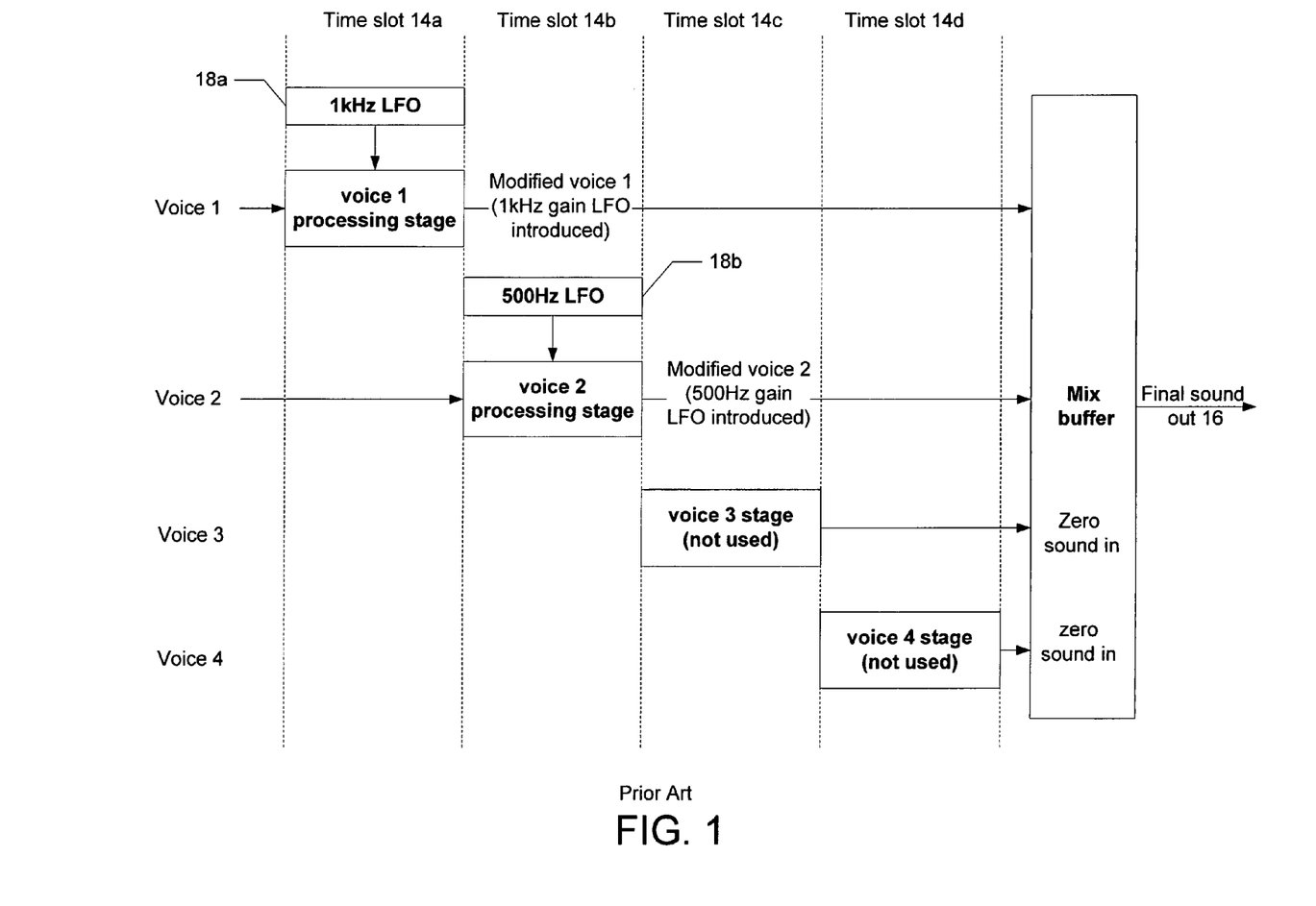
FIG. 1 is a timing diagram showing an example processor during the processing of an input sound.

To illustrate the above, consider the example shown in FIG. 1, which shows a timing diagram of an example processor during the processing of an input sound. In this example, assume that the sound processor is capable of supporting an input sound having only four voices. Due to requirements imposed on the design, this system processes the four voices serially in four separate voice time slots 14a-14d. Voice 1 is processed during time slot 14a, voice 2 is processed during time slot 14b, and so on. All four voices are completed within the required time to send the modified final sound 16 out the speaker system.

In this example, the processor is limited to applying only one gain LFO to each voice in the corresponding time slots 14a-14d. For the input sound shown in this example, the programmer only needs to make use of two of the voices, voices 1 and 2 for this application. Voice 1's LFO 18a is programmed to be 1 khz while voice 2's LFO 18b is programmed to be 500 hz. Voices 3 and 4 are unused in this example. If the programmer wishes to apply more than one LFO to voice 2 (a 500 Hz and a 1 kHz), he is not able to instruct the sound processor to do so unless it supported more than one LFO application per voice. Continuing the example further, let us suppose the processor supported two LFO applications per voice; the programmer could then apply both frequencies to the voice. But if he wanted to supply a third, he would not be able to.

The problem can be looked at in a different way as well. Using the same example processor description presented above, imagine that the programmer wishes to apply a 1 kHz LFO to both voices 1 and 2. The same number of cycles is necessary to apply the LFO to voice 1 as is needed to apply it to voice 2. Therefore, to apply a single frequency LFO (which takes n cycles) to x number of voices requires x*n cycle overhead—that is a lot of waste to do the same thing x number of times. If the programmer could tap into the power of the unused channels, this waste could be eliminated. For low-power designs, a solution to this problem could make the design requirements more achievable. Methods of solving this problem are currently unknown.

Conventional methods for solving the problem of applying more effect options to a voice time slot than what is capable of the hardware requires the sound artist or programmer to provide additional pre-processed sound samples than what would be necessary had the sound processor been able to support additional effects. Using the first example above, if the programmer wanted to apply both a 1 kHz and 500 Hz gain LFO to the sound, the programmer would have to supply a pre-processed sound that has already been modified by either the 1 kHz LFO or the 500 Hz LFO and then instruct the processor to apply the remaining one.

There are several disadvantages of requiring the programmer to provide additional pre-processed voices. First, the solution requires more system memory to store more variants of pre-processed voices, and results in longer software development time to manage a larger number of input voices. In addition, the solution requires longer artistic development time due to having to pre-process more input sounds.

Accordingly, what is needed is an improved method and system for applying more effects to voices in an input sound than is capable of being supported by a sound processor. The present invention addresses such a need.

BRIEF SUMMARY OF THE INVENTION

The present invention provides a method and system for applying more effects to voices in an input sound than is capable of being supported by a sound processor. Aspects of the invention include identifying at least one of the voices of the input sound as a voice bus channel; and during processing of the input sound, inputting and adding sound that was mixed from outputs of previously processed voices to the voice bus channel to create a summed result. An effect specified for the voice bus channel is then applied to the summed result, thereby applying the effect to the previous the process voices.

According to the method and system disclosed herein, the use of voice bus channels reduces the need to increase system clock speed to obtain more processing capabilities, and reduces power consumption by allowing voices to consolidate similar function application by directing that processing to a voice bus channel. The solution is low cost in terms of both implementation and processing.

DETAILED DESCRIPTION OF THE INVENTION

The present invention relates to voice bussing in sound processors. The following description is presented to enable one of ordinary skill in the art to make and use the invention and is provided in the context of a patent application and its requirements. Various modifications to the preferred embodiments and the generic principles and features described herein will be readily apparent to those skilled in the art. Thus, the present invention is not intended to be limited to the embodiments shown, but is to be accorded the widest scope consistent with the principles and features described herein.

The present invention introduces the idea of taking advantage of the features that additional voice time slots provided in a sound processor by defining one or more voices corresponding to the time slots as "voice bus channels." According to the method and system disclosed herein, a processor uses a voice bus channel to not only process the corresponding voice (just as they would if not declared as a bus), but to also use as input, sound that was mixed from outputs of previously processed voices. One or more time slot outputs can be fed into the voices bus channel as input. According to the present invention, it is even possible for a voice bus channel to use its own output as an input.

In operation, to apply effects to an input sound comprising multiple voices, one of the voices is processed by applying an effect and the result of this process is stored. A second voice is designated as a voice bus channel and is processed by applying the same or different effect using the stored result as input. The consequence of this is that the second effect applied to the voice bus channel is also applied to the first voice. Therefore, in a processor limited to only applying one effect to a voice in one time slot, the present invention enables the processor to modify the voice with two effects, instead of one, using the voice bus channel.

Figure 2:
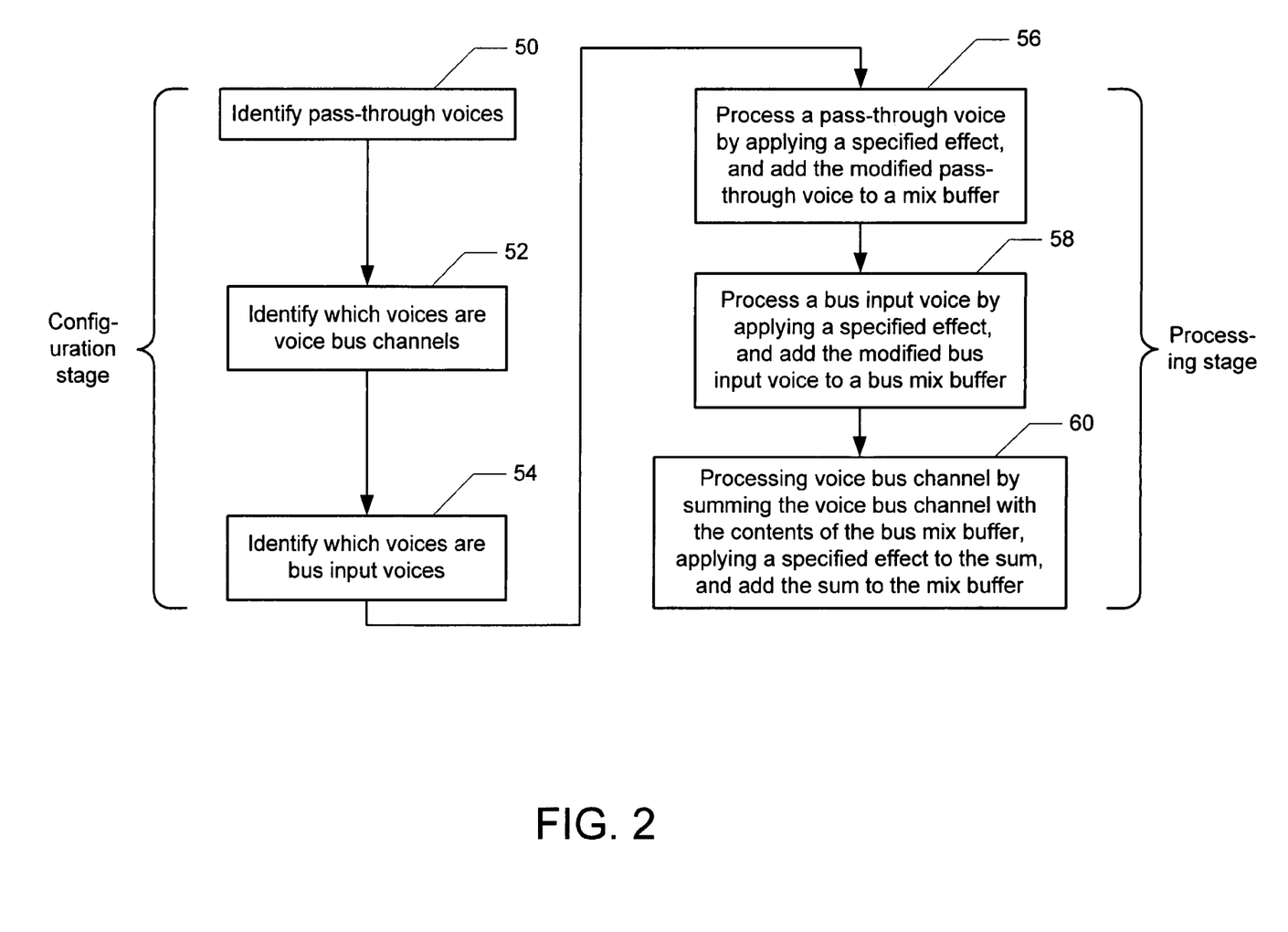
FIG. 2 is a flow diagram illustrating the process of applying effects to voices in an input sound in a manner that allows more effects to be applied per voice than a sound processor is capable of supporting.

FIG. 2 is a flow diagram illustrating the process of applying effects to voices in an input sound in a manner that allows more effects to be applied per voice than a sound processor is capable of supporting. The process includes two stages; a configuration stage and a processing stage. During the configuration stage, a developer of a program that will instruct the sound processor how to process a particular input sound identifies the following types of voices in the input sound. In step 50, the developer identifies which voices are pass-through voices, which are voices that will be processed normally. In step 52, a developer identifies which voices, and therefore which time slots, are voice bus channels. Voice bus channels add at least one previously processed voice to the current voice before applying the effect specified for the current voice. And in step 54, the developer identifies which voices are bus input voices. Bus input voices are similar to pass-through voices, but the results are added to a mix buffer for subsequent input to a voice bus channel.

Figure 3:
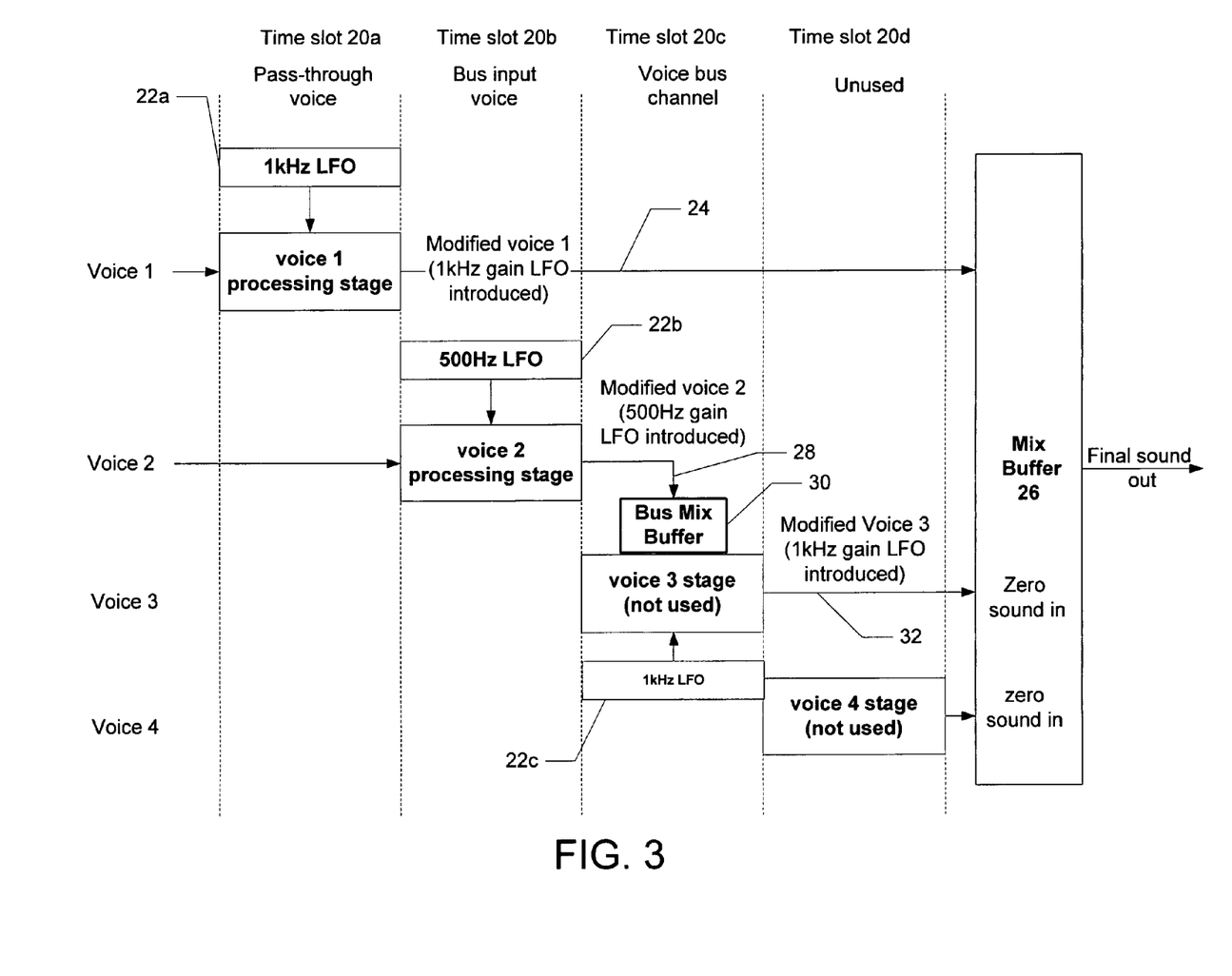
FIG. 3 is a timing diagram illustrating the principles of the present invention in a four voice example.

FIG. 3 is a timing diagram illustrating the principles of the present invention in a four voice example. As in the previous example, the input sound includes voices 1-4, which are processed serially in corresponding voice time slots 20a-20d (collectively referred to as time slots 20), and the sound processor is limited to applying one effect per voice/time slot 20. In this example, voice 1 is a pass-through voice, voice 2 is a bus input voice, voice 3 is a voice bus channel, and voice 4 is unused.

Referring now to both FIGS. 2 and 3, during the processing stage, the sound processor processes the voices of the input sound as follows. In step 56, a pass-through voice is processed by applying the specified effects to the voice to create a modified pass-through voice, and the modified pass-through voice is added to a mix buffer 26. In the example shown in FIG. 3, voice 1 has been identified as a pass-through voice in which a 1 kHz LFO effect 22a is applied the voice in time slot 20a. The modified voice 24 is added to mix buffer 26.

In step 58, a bus input voice is processed by applying the specified effects to the voice to create a modified bus input voice, and the modified bus input voice is added to a bus mix buffer 30. In the example shown in FIG. 3, voice 2 has been identified as a bus input voice. A 500 hertz LFO effect 22b is applied to voice 2 during time slot 20b, and the modified voice 28 is added to bus mix buffer 30.

In step 60, a voice bus channel is processed by summing the voice bus channel with contents of the bus mix buffer 30. The bus mix buffer 30 stores sound that was mixed from outputs of previously processed bus input voices. After the contents of the bus mix buffer 30 are mixed with the voice bus channel, a specified effect is applied to the sum to create a modified sum 32, and the modified sum 32 is added to the mix buffer 26. In the example shown in FIG. 3, voice 3 has been identified as a voice bus channel. Voice 3 is processed by adding the contents from the bus mix buffer 30 to voice 3 and then applying the specified 1 kHz LFO 22c to the summed result. The summed result 32 is then added to the mix buffer 26. At the conclusion of the last time slot 20d, the contents of the mix buffer 26 are output as the final sound.

This example shows that voice 2 is modified using its own LFO, but is also modified by applying a second LFO by defining voice 3 as a bus channel. Voice channel 3 can function as a normal time slot by reading and manipulating its corresponding data, but as a bus it becomes responsible for taking in other time slot's data.

Figure 4:
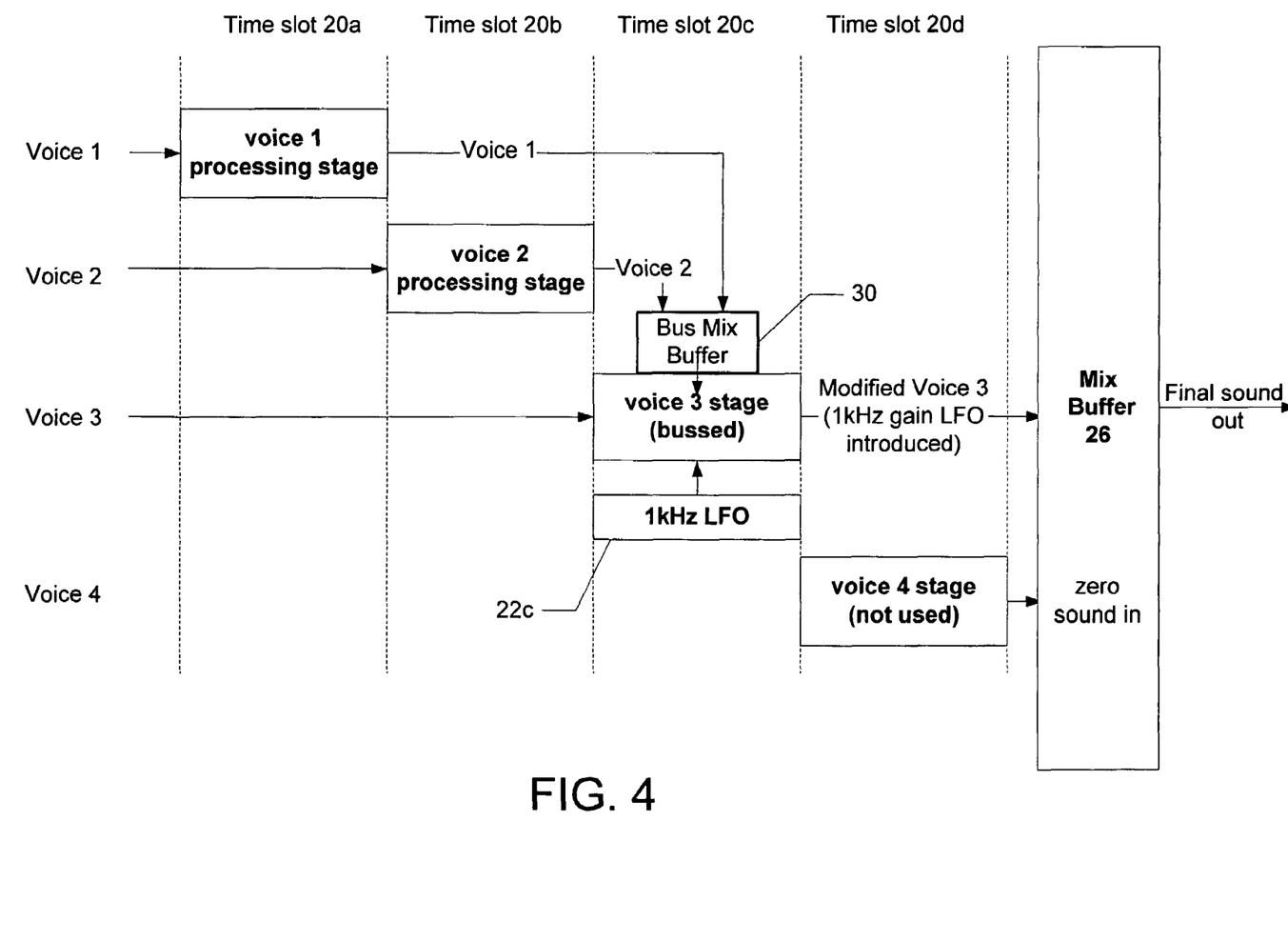
FIG. 4 is a timing diagram showing an example similar to that of FIG. 3, but where the voice bus channel (voice 3) receives inputs from two previously processed bus input voices (voices 1 and 2).

FIG. 4 is a timing diagram showing an example similar to that of FIG. 3, but where the voice bus channel (voice 3) receives inputs from two previously processed bus input voices (voices 1 and 2). In this example, the present invention simplifies the process of applying a 1 kHz LFO to voices 1, 2, and 3 by utilizing voice 3 as a voice bus channel and applying the 1 kHz LFO to the their summed result, instead of wasting cycles and power by having the LFO individually applied to the voices.

The above examples show an LFO as the example effect to apply to the voices of the input sound. LFO is only one example, however. In sound processors, there are typically numerous effects available for applying to the voices. Other example effects include gain envelopes and pitch envelopes. If a voice time slot is declared as a voice bus channel, the processor is capable of applying whichever effects are available in the time slot, if instructed to do so.

Figure 5:
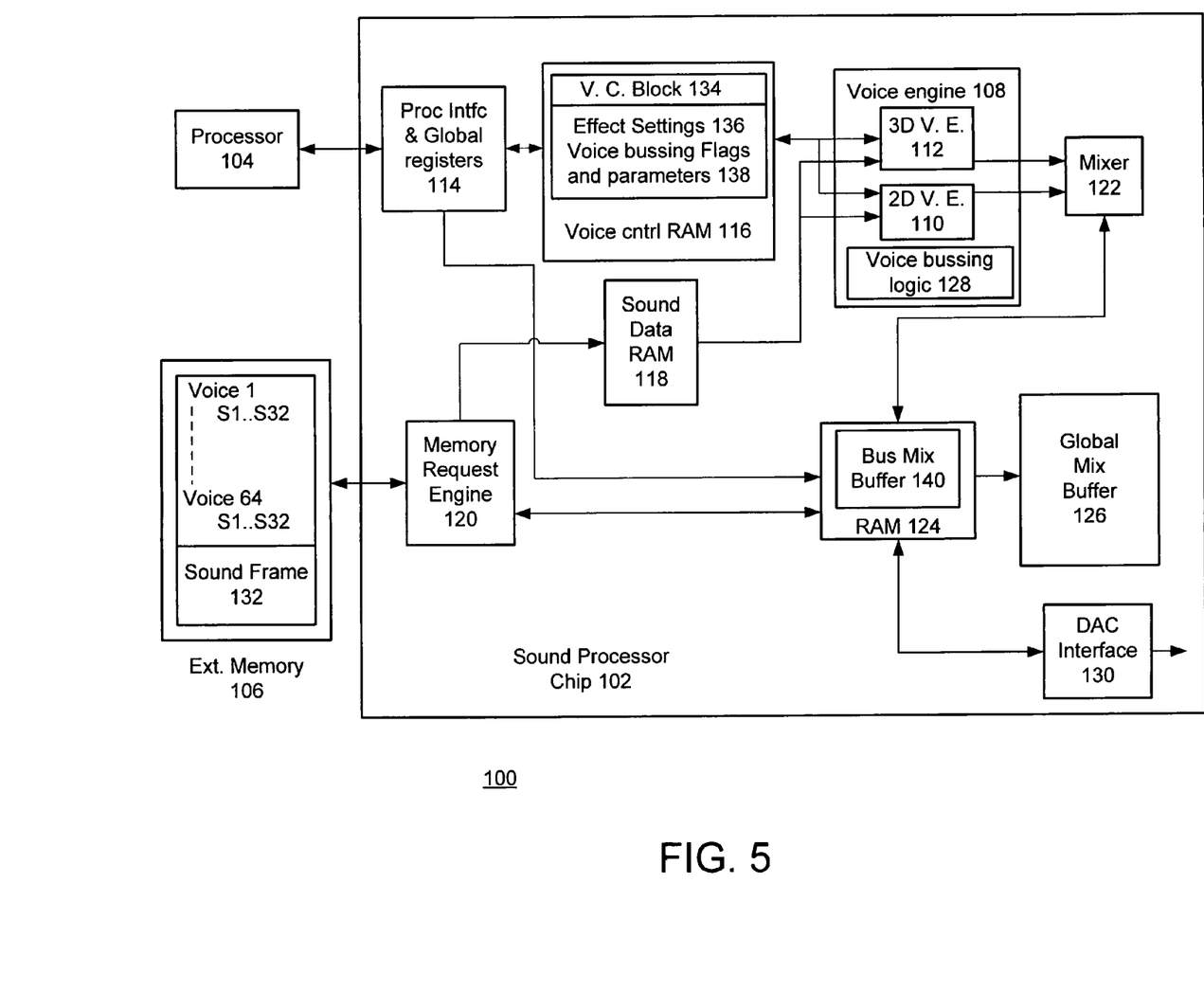
FIG. 5 is a diagram illustrating a sound processing system for implementing voice channel bussing in accordance with a preferred embodiment of the present invention.

FIG. 5 is a diagram illustrating a sound processing system for implementing voice channel bussing in accordance with a preferred embodiment of the present invention. The sound processing system 100 includes a sound processor chip 102 that interacts with an external processor 104 and external memory 106. The sound processor chip 102 includes a voice engine 108, which optionally includes separate 2-D and 3-D voice engines 110 and 112, a processor interface and global registers 114, a voice control RAM 116, a sound data RAM 118, a memory request engine 120, a mixer 122, a global mix buffer 126, a digital-to-analog converter (DAC) interface 130, and a RAM 124.

In order to implement the present invention, the voice engine 108 is provided with voice bussing logic 128, a voice control block 104 is provided with voice bussing flags and parameters 138, and the RAM 124 is provided with a bus mix buffer 140.

Sound is input to the sound processor chip 102 from the external memory 106 as a series of sound frames 132. Each sound frame 132 comprises some number of voices (e.g., sixty-four), and each voice includes some number of samples (e.g., thirty-two). The voice engine 108 processes each of the sixty-four voices of a frame 132 one at a time. The voice control block 134 stored in the voice control RAM 116 stores the settings that specify how the voice engine 108 is to process each of the sixty-four voices. The voice engine 108 begins by reading the voice control block 134 to determine the location of the input sound and sends a request to the memory request engine 120 to fetch the thirty-two samples of the voice being processed. The thirty-two samples are then stored in the sound data RAM 118 and processed by the voice engine 108 according to the contents of the corresponding control block 134.

The settings stored in the voice control block 134 include effects settings 136, and the voice bussing flags and parameters 138 of the present invention. The effect settings 136 may include left/right volumes, a gain envelope, and LFO. The voice bussing flags and parameters 138 identify which of the voices in the input sound frame 132 are pass-through voices, bus input voices, and voice bus channels. For voice bus channels, parameters values identify which voices are to be used as the bus input voices.

During processing of the sound, the contents of the control block 134 may be altered by a high-level program (not shown) running on the processor 104. The processor interface 114 accepts the commands from processor, which are first typically translated down to AHB bus protocol. According to the present invention, during processing, the program is configured by the developer to set the voice bussing flags and parameters 138 accordingly.

The voice engine 108 reads the values from the control block 134 and applies effect settings 136 to the voices based on the settings of the voice bussing flags and parameters 138, as described above. The resulting values are then sent to the mixer 122. The mixer 122 maintains different banks of memory in the RAM 124, including 2-D and 3-D banks (not shown), and the bus mix buffer 140. As described above, the results from bus input voices are temporarily stored and the bus mix buffer 140. After all the samples are processed for a particular voice, the contents of the bus mix buffer 140 are input to the global mix buffer 126 to produce the final output. This final output is input to the DAC interface 130 for output to a DAC to deliver the final output as audible sound.

Figure 6:
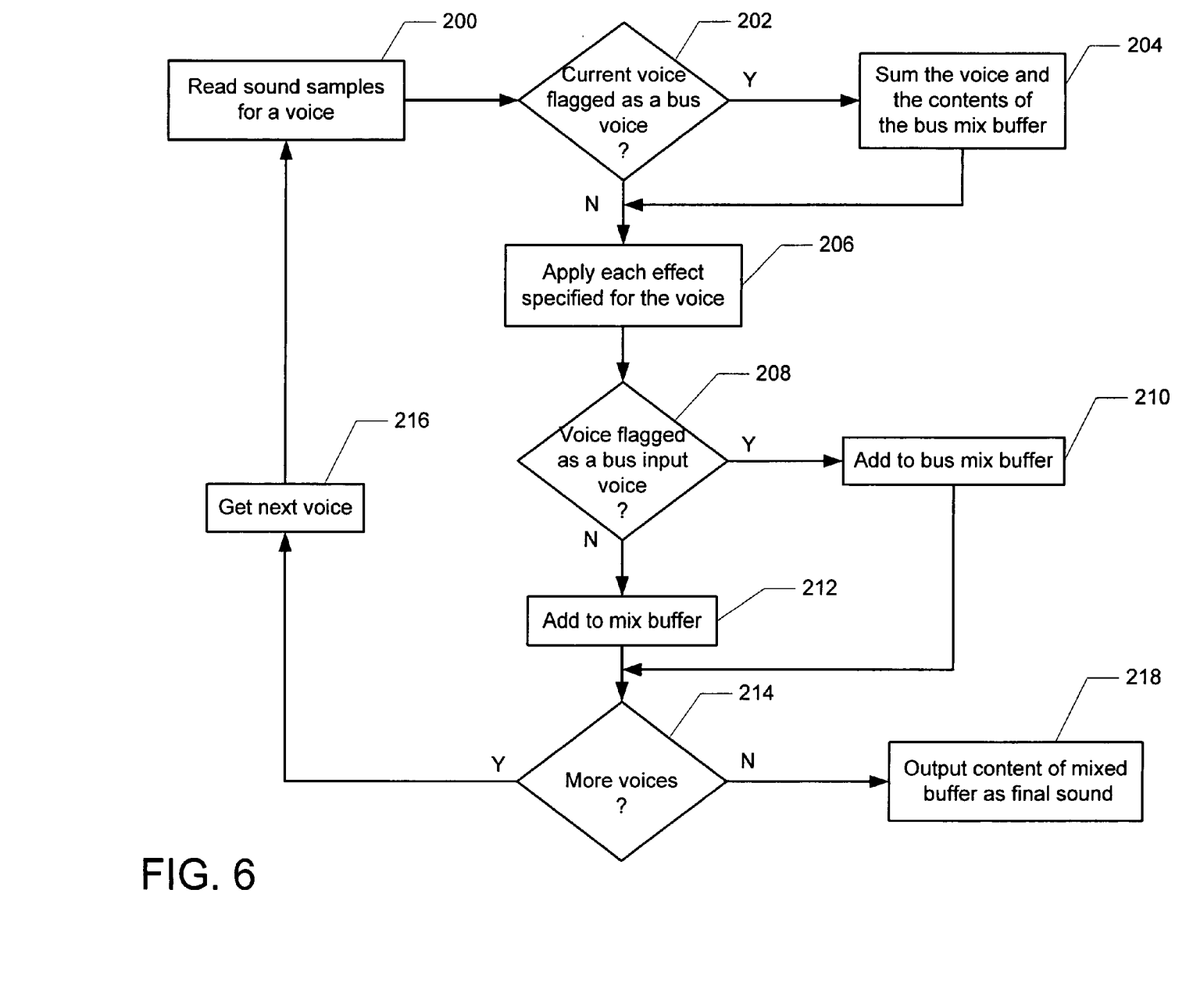
FIG. 6 as a flow diagram illustrating the processing performed by the system to apply effects to the input sound in accordance with the present invention.

FIG. 6 as a flow diagram illustrating the processing performed by the system 100 to apply effects to the input sound 132 in accordance with the present invention. In step 200, the voice engine 108 reads the sound samples for a voice. In step 202, it is then determined if the current voice is flagged as a voice bus channel by the voice bussing flags 138. If so, then in step 204 a new value for the current voice is calculated by summing the voice and the contents of the bus mix buffer 140. In step 206, each effect specified by the effect settings 136 for the current voice is then applied to the current voice.

In step 208, it is then determined if the current voice is flagged as a bus input voice. If so, then step 210, the mixer 122 adds the result of step 206 to the bus mix buffer 140. If the current voice is not flagged as a bus input voice, then the voice is a voice channel bus, and the mixer 122 adds the result of step 206 to the global mix buffer 126 in step 212. The voice engine 108 continues this process until there are no more voices to process as shown in steps 214 and 216. At the completion of the process, the contents of the global mix buffer 126 are output as the final sound in step 218.

The examples above highlight a serially configured sound processing system. Voice channel bussing also applies to sound processors which are more parallel in nature. Channels declared as busses in parallel oriented processors simply process the output of the voice channels that feed it one frame later.

Figure 7:
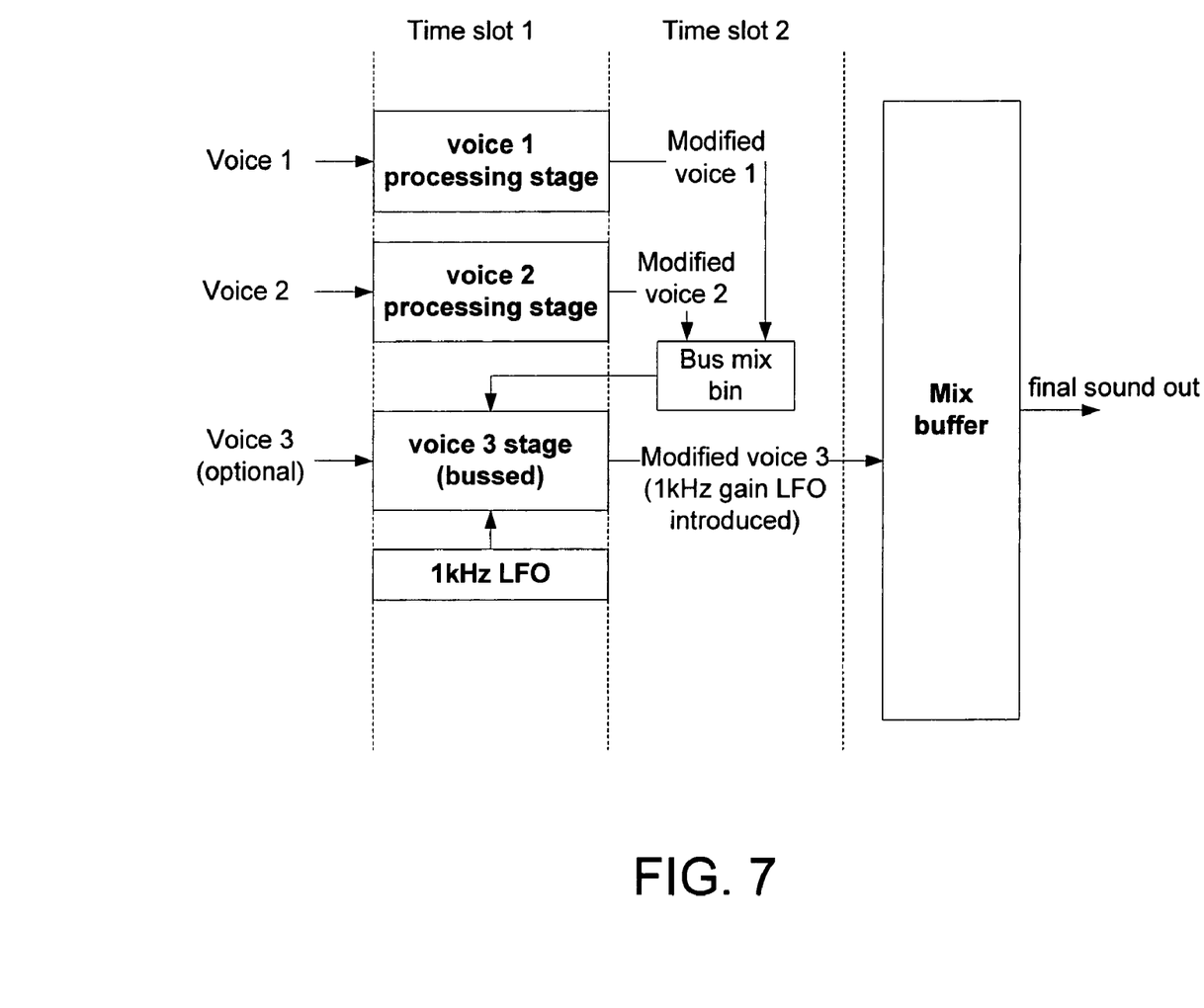
FIG. 7 shows an example of voice channel bussing in a parallel processing environment in accordance with the present invention

FIG. 7 shows an example of voice channel bussing in a parallel processing environment in accordance with the present invention. This is a four voice example showing of how voices 1 and 2 can use voice bus channel 3 to apply an LFO to their outputs. Like in the previous examples, voices 1 and 2 write their results to a mix bin. But since voice 3 works in parallel with voices 1 and 2, the LFO will not be applied to them until the next time voice 3 performs its processing.

A method and system for applying more effects to voices in an input sound than is capable of being supported by a sound processor has been disclosed. A sound processor implemented in accordance with the present invention reduces the limitations imposed on single voice time slots by borrowing the functionality of the other time slots. Also, the number of effects or functions that can be applied to any single sound source is multiplied by the number of voices capable of being designated as voice bus channels without increasing the number of clock cycles necessary to perform those operations within any given sound processing frame. Further voices that are defined as voice bus channels do not necessarily have to give up their ability to be responsible for their own sound (as they would be if not programmed as a bus).

The use of voice bus channels in accordance with the present invention, reduces the need to increase system clock speed to obtain more processing capabilities, and reduces power consumption by allowing voices to consolidate similar function application by directing that processing to a voice bus channel. The solution is low cost in terms of both implementation and processing.

The present invention has been described in accordance with the embodiments shown, and one of ordinary skill in the art will readily recognize that there could be variations to the embodiments, and any variations would be within the spirit and scope of the present invention. Accordingly, many modifications may be made by one of ordinary skill in the art without departing from the spirit and scope of the appended claims.

I claim:

1. A method for applying effects to an input sound comprising multiple voices, comprising:

during a configuration stage, identifying a first voice as a bus input voice, and identifying a second voice as a voice bus channel;

processing the first voice by applying a first effect and storing a result;

processing the second voice by applying a second effect using the stored result as input, thereby applying the second effect to the first voice.

2. The method of claim 1 further including: processing the second voice by adding the stored result to the second voice and then applying the second affect to the sum.

3. The method of claim 2 further including: during the configuration stage, optionally identifying one or more of the voices as a pass-through voice.

4. The method of claim 3 further including: during the processing stage,
- processing the pass-through voice by applying a specified effect to the pass-through voice to create a modified pass-through voice, and adding the modified pass-through voice to an output buffer,
- processing the bus input voice by applying a specified effect to the bus input voice to create a modified bus input voice, and adding the modified bus input voice to a bus mix buffer, and
- processing the voice bus channel by using the contents of the bus mix buffer as input, and adding the summed result to the output buffer.

5. The method of claim 1 further comprising: providing the voice identifications as flags.

6. The method of claim 5 further comprising: providing the flags within a voice control block.

7. The method of claim 6 further comprising: for the flag identifying the voice bus channel, further providing parameters indicating which bus input voices to use as input.

8. The method of claim 7 further comprising: performing the configuration with a program that controls the settings of the voice control block.

9. The method of claim 8 further comprising: processing the voice sample with a sound processor.

10. The method of claim 9 further comprising: configuring the sound processor to read settings of the voice control block to determine whether the voice sample currently being processed is a pass-through voice, a bus input voice, or a voice bus channel.

11. A method for applying effects to voices of an input sound, comprising:
- identifying at least one of the voices of the input sound as a voice bus channel; and
- during processing of the input sound, inputting and adding sound that was mixed from outputs of previously processed voices to the voice bus channel to create a summed result; and
- applying an effect specified for the voice bus channel to the summed result, thereby applying the effect to the previous the process voices.

12. The method of claim 11 further including: performing the identification during a configuration stage.

13. The method of claim 12 further including: during the configuration stage, optionally identifying one or more of the voices as a pass-through voice, and identifying at least a second one of the voices as a bus input voice.

14. The method of claim 13 further including: during the processing stage,
- processing the pass-through voice by applying a specified effect to the pass-through voice to create a modified pass-through voice, and adding the modified pass-through voice to an output buffer,
- processing the bus input voice by applying a specified effect to the bus input voice to create a modified bus input voice, and adding the modified bus input voice to a bus mix buffer, and
- processing the voice bus channel by summing the voice bus channel with contents of the bus mix buffer, applying a specified effect to the sum to create a modified sum, and adding the modified sum to the output buffer.

15. The method of claim 12 further comprising: providing the voice identifications as flags.

16. The method of claim 15 further comprising: providing the flags within a voice control block.

17. The method of claim 16 further comprising: for the flag identifying the voice bus channel, further providing parameters indicating which bus input voices to use as input.

18. The method of claim 17 further comprising: performing the configuration with a program that controls the settings of the voice control block.

19. The method of claim 18 further comprising: processing the voice sample with a sound processor.

20. The method of claim 19 further comprising: configuring the sound processor to read settings of the voice control block to determine whether the voice sample currently being processed is a pass-through voice, a bus input voice, or a voice bus channel.

21. A method for applying more effects to voices in an input sound than is capable of being supported by a sound processor, comprising:
- during configuration of a voice sample that comprises multiple voices,
  - optionally identifying one or more of the voices as a pass-through voice,
  - identifying at least a first one of the voices as a voice bus channel, and
  - identifying at least a second one of the voices as a bus input voice; and
- during processing of the voice sample,
  - processing the pass-through voice by applying a specified effect to the pass-through voice to create a modified pass-through voice, and adding the modified pass-through voice to an output buffer,
  - processing the bus input voice by applying a specified effect to the bus input voice to create a modified bus input voice, and adding the modified bus input voice to a bus mix buffer, and
  - processing the voice bus channel by summing the voice bus channel with contents of the bus mix buffer, applying a specified effect to the sum to create a modified sum, and adding the modified sum to the output buffer.

22. The method of claim 21 further comprising: providing the voice identifications as flags.

23. The method of claim 22 further comprising: providing the flags within a voice control block.

24. The method of claim 23 further comprising: for the flag identifying the voice bus channel, further providing parameters indicating which bus input voices to use as input.

25. The method of claim 24 further comprising: performing the configuration with a program that controls the settings of the voice control block.

26. The method of claim 21 further comprising: processing the voice sample with a sound processor.

27. The method of claim 26 further comprising: configuring the sound processor to read settings of the voice control block to determine whether the voice sample currently being processed is a pass-through voice, a bus input voice, or a voice bus channel.

28. A system for applying effects to an input sound comprising multiple voices, comprising:
- a bus mix buffer for temporary storage;
- a mix buffer for storing a final output sound;
- a voice control block for storing settings that specify how each of the voices is to be processed, the voice control block including effects settings for each voice, and at least one flag identifying whether a currently processed voice is a pass-through voice, a bus input voice, or a voice bus channel; and voice bussing logic configured to process the voices by,
- if the currently processed voice is flagged as the pass-through voice, applying a specified effect from the effects settings to the pass-through voice to create a modified pass-through voice, and adding the modified pass-through voice to the mix buffer,
- if the currently processed voice is flagged as the bus input voice, processing the bus input voice by applying a specified effect from the effects settings to the bus input voice to create a modified bus input voice, and adding the modified bus input voice to the bus mix buffer, and
- if the currently processed voice is flagged as the voice bus channel, processing the voice bus channel by summing the voice bus channel with contents of the bus mix buffer, applying a specified effect from the effects settings to the sum to create a modified sum, and adding the modified sum to the mix buffer.

29. The system of claim 28 wherein the voice busing logic is implemented in a voice engine.

30. The system of claim 29 wherein the voice control block is stored in a voice control RAM that is accessed by the voice engine.

31. The system of claim 30 wherein bus mix buffer, the mix buffer, the voice engine, and voice control RAM are implemented on a sound processor chip.

32. The system of claim 31 further including a program executing on a processor external to the sound processor chip that is capable of changing the settings in the voice control block.

* * * * *